(No Model.)

E. H. FLEMING.
HEDGE.

No. 253,362. Patented Feb. 7, 1882.

WITNESSES
Fred. G. Dieterich.
Geo Binkenburg

Edward H. Fleming
INVENTOR,
by Louis Bagger & Co.
Attorneys

UNITED STATES PATENT OFFICE.

EDWARD H. FLEMING, OF THORP'S SPRING, TEXAS.

HEDGE.

SPECIFICATION forming part of Letters Patent No. 253,362, dated February 7, 1882.

Application filed October 31, 1881. (No model.)

*To all whom it may concern:*

Be it known that I, EDWARD H. FLEMING, of Thorp's Spring, in the county of Hood and State of Texas, have invented certain new and useful Improvements in Hedges; and I do hereby declare that the following is a full, clear, and exact description of the invention, which will enable others skilled in the art to which it appertains to make and use the same, reference being had to the accompanying drawings, which form a part of this specification.

My invention has relation to natural or living hedges; and it consists in an improved method of planting and training the cactus-plant (preferably of the species known as the "scabbard" or "brush cactus") to adapt it to form a thick and impenetrable fence which shall resist the attacks of cattle, and will grow regularly and evenly after the young plants have been properly trained.

Figure 1:
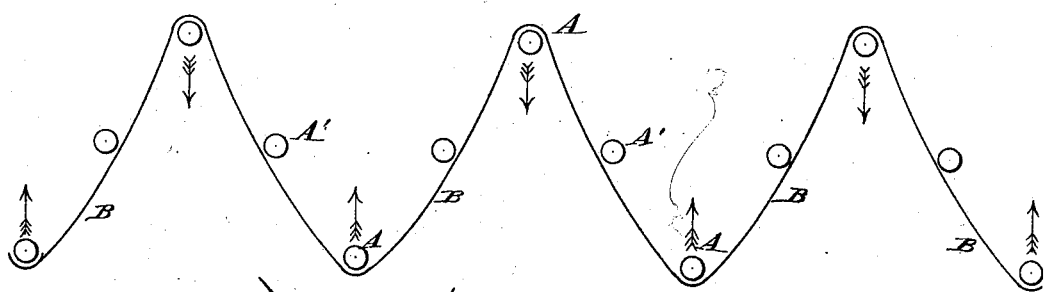
Figure 2:
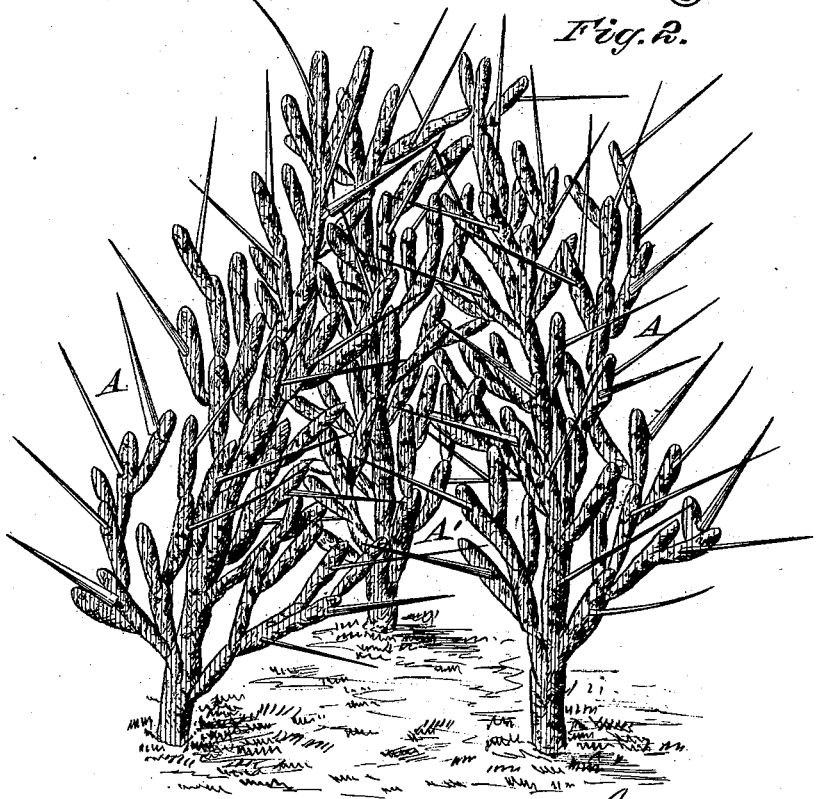

In the drawings hereto annexed, Figure 1 represents a diagram of the method of planting and training the cactus-plants, and Fig. 2 is a perspective view of a portion of the fence.

Similar letters of reference indicate corresponding parts in all the figures.

A A are the young cactus-plants, which are set out in two rows, as shown in the diagram, the plants of one row alternating with those of the other. A third row of plants, A', is set out midway between the rows A A, in the manner shown in the drawings. The distance between the two outer rows, A A, depends upon the thickness or width which it is desired to give the fence at its base. After the plants thus set out have attained a suitable height they are trained in the following manner: A rope or chain, B, is fastened at one end to a post, tree, or other suitable support, and passed around the plants A forming the end rows, as clearly shown in Fig. 1. This having been done, the rope is tightened by pulling its free end, which has the effect of tilting the plants A toward one another, as indicated by the small arrows, and by fastening the free end of the training-rope B they will remain in this position. As the plants grow up and attain their full size they will grow together and cross one another, as shown in Fig. 2. Meanwhile the plants A' of the middle row will grow up straight, thus filling up and blocking the open spaces between the end plants, A A, and form an absolutely solid and impenetrable fence. It will also be observed that by this arrangement the plants mutually brace one another, so as to form a compact wall which will resist hail-storms and gales, however violent. After the plants have been properly trained in the manner described, the training-rope B will be no longer required, and may be removed.

Having thus described my invention, I claim and desire to secure by Letters Patent of the United States—

A living cactus hedge or fence composed of three rows of plants, A A' A, arranged as described, combined with a chain or rope, B, passing around the alternating plants of the outer rows, as described, whereby the said plants will be trained to converge toward each other, substantially as set forth.

In testimony that I claim the foregoing as my own I have hereunto affixed my signature in presence of two witnesses.

EDWARD H. FLEMING.

Witnesses:
JNO. H. TRAYLOR,
H. M. BERRY.